United States Patent [19]
Rossi

[11] Patent Number: 5,918,163
[45] Date of Patent: Jun. 29, 1999

[54] ELECTRONIC CARD ASSEMBLY HAVING A RETRACTABLE ANTENNA

[75] Inventor: Markku J. Rossi, Houston, Tex.

[73] Assignee: Compaq Computer Corporation, Houston, Tex.

[21] Appl. No.: 08/939,460

[22] Filed: Sep. 29, 1997

Related U.S. Application Data

[63] Continuation of application No. 08/414,758, Mar. 31, 1995, abandoned.

[51] Int. Cl.$^6$ ...................................................... H04B 1/08
[52] U.S. Cl. .......................... 455/90; 455/128; 455/348; 455/351; 455/276.1; 343/702; 343/700 MS; 343/880
[58] Field of Search ............................. 455/90, 128, 347, 455/348, 351, 276.1, 280, 575, 558; 343/702, 700 MS, 880; 235/486

[56] References Cited

U.S. PATENT DOCUMENTS

| | | | |
|---|---|---|---|
| 4,849,765 | 7/1989 | Marko | 343/702 |
| 4,920,352 | 4/1990 | Martensson et al. | 343/702 |
| 5,004,899 | 4/1991 | Ueda | 235/492 |
| 5,138,328 | 8/1992 | Zibrik et al. | 343/702 |
| 5,183,404 | 2/1993 | Aldous et al. | 439/55 |
| 5,300,938 | 4/1994 | Maroun et al. | 343/702 |
| 5,337,061 | 8/1994 | Pye et al. | 343/702 |
| 5,343,319 | 8/1994 | Moore | 359/152 |
| 5,357,091 | 10/1994 | Ozawa et al. | 235/380 |
| 5,361,061 | 11/1994 | Mays et al. | 340/825.44 |
| 5,365,221 | 11/1994 | Fennell et al. | 340/636 |
| 5,373,149 | 12/1994 | Rasmussen | 235/492 |
| 5,410,749 | 4/1995 | Siwiak et al. | 455/351 X |
| 5,412,392 | 5/1995 | Tsunekawa | 343/702 |
| 5,519,577 | 5/1996 | Dudas et al. | 455/90 X |
| 5,563,400 | 10/1996 | Le Roux | 235/486 |

Primary Examiner—Wellington Chin
Assistant Examiner—Philip J. Sobutka
Attorney, Agent, or Firm—Jenkens & Gilchrist

[57] ABSTRACT

A plug-in electronic card assembly having a retractable antenna comprises a casing with a connector for coupling the electronic card assembly to a host device and an antenna that is selectively movable between a first position, in which the antenna is enclosed within the casing, and a second position, in which the antenna is substantially outside of the casing. In an embodiment of the invention, the antenna comprises a circular antenna element disposed on a printed circuit board that is movable, between the first and second positions, by sliding the printed circuit board in grooves contained in sides of an electronic card assembly casing having PCMCIA standard dimensions. When the antenna is in the second position, transmission pads provide an RF signal path between the antenna and a second printed circuit board contained within the casing.

14 Claims, 4 Drawing Sheets

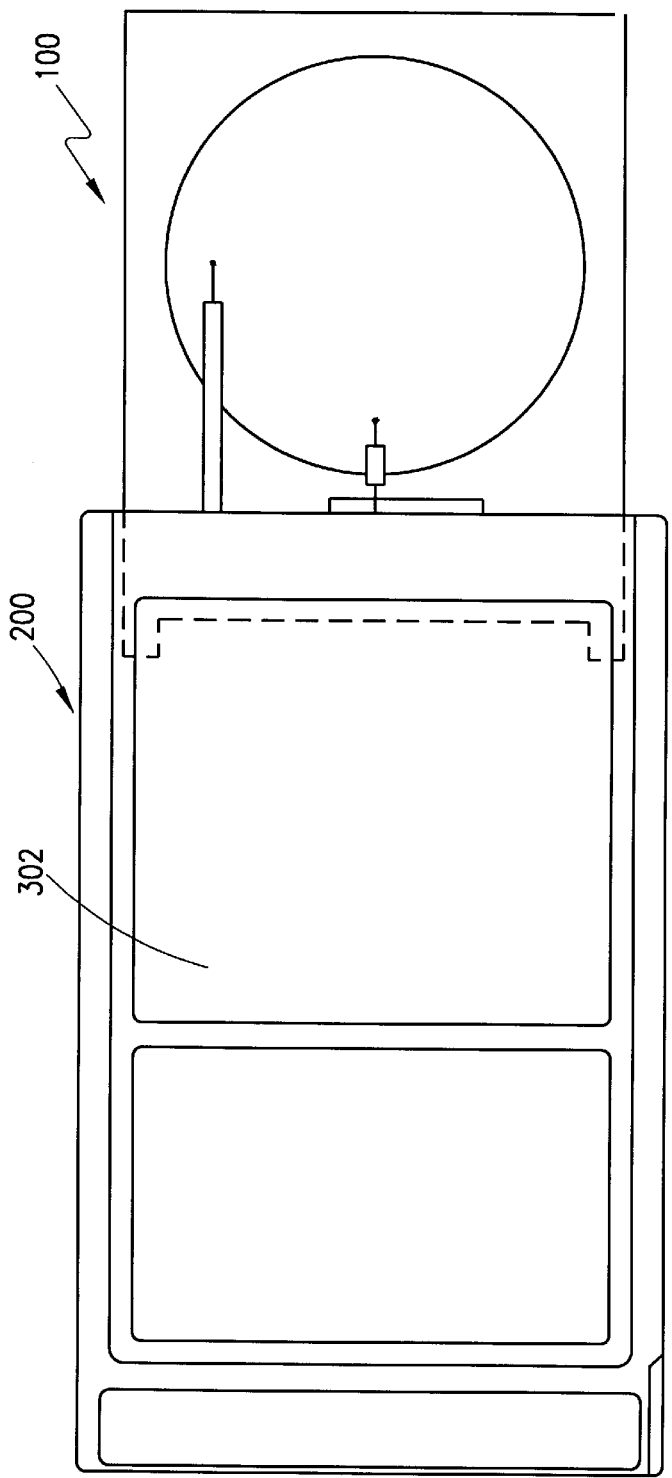
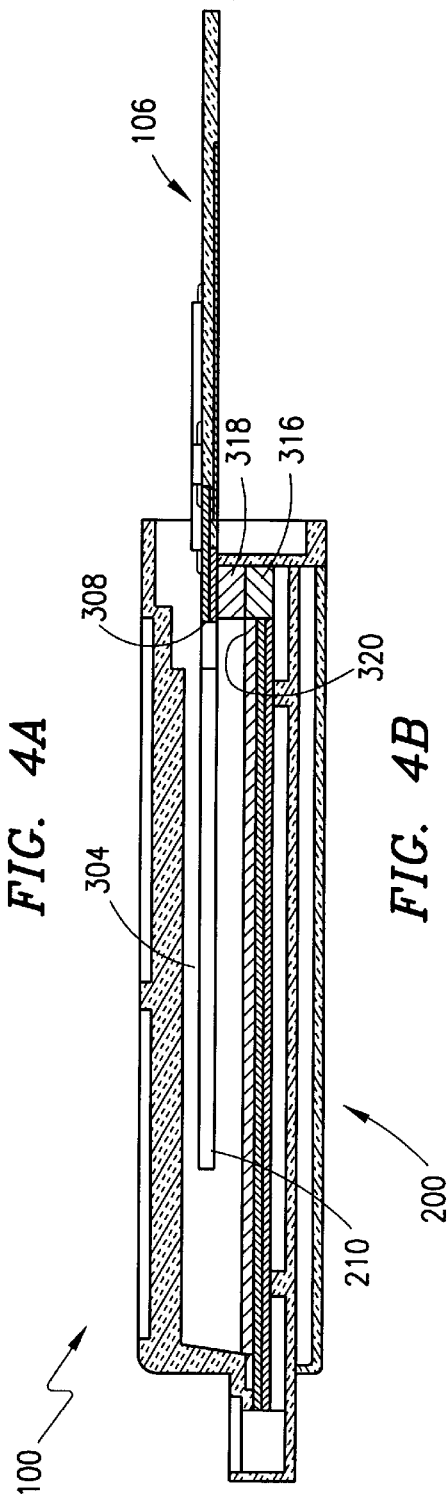
FIG. 4A
FIG. 4B

ELECTRONIC CARD ASSEMBLY HAVING A RETRACTABLE ANTENNA

This application is a continuation of application No. 08/414,758, filed on Mar. 31, 1995, which was abandoned upon the filing hereof.

BACKGROUND OF THE INVENTION

1. Technical Field of the Invention

The present invention relates to the field of antennas, and more particularly to an electronic card assembly having a retractable antenna.

2. Description of the Prior Art

Electronic card assemblies containing devices such as modems and pagers for use with portable terminals are gaining increasing importance in the telecommunications area. These card assemblies are used with portable terminals such as portable computers, laptop computers and personal digital assistants (PDAs) to allow data transfer and communication between the portable terminal and a wireless network. A common form for these card assemblies is a plug-in modular unit that may be plugged into a slot on a host terminal and, furthermore, easily unplugged and removed for transportation or easily changed to allow communication with different wireless networks. The increasing importance of these electronic card assemblies is of such a magnitude that it has caused a movement toward standardization in the computer and telecommunications industry. For example, the Personal Computer Memory Card International Association (PCMCIA) has set forth a widely used standard that defines a 68 pin interface and slot and assembly dimensions for the interface between a card assembly and a host terminal. Card assemblies that conform to this standard are known as PCMCIA cards.

When a card assembly such as a PCMCIA card is used for data transfer and communication between a host terminal and a wireless network it is necessary that some sort of antenna be provided. Ideally, any antenna provided should be optimized for communications using the frequencies of the particular wireless system in which the host terminal is operating. Additionally, an antenna external to the host terminal and not permanently built into the terminal device would be advantageous. This would prevent the need for designing an antenna for use in one wireless system into the portable device without certainty as to the actual wireless systems the device would be operating in, when the antenna may not be optimal for use in other systems. An antenna external to the host device would also prevent the need for a connection between the electronic card assembly and host terminal separate from the PCMCIA interface, such as a coaxial cable and connectors to connect the card assembly receivers and/or transmitters to the antenna in the portable terminal. This type of connection would be bulky and expensive for use in a portable system.

An antenna contained in the card assembly would offer the above mentioned advantages of an antenna external to the host terminal. An antenna of this type could be configured to receive or transmit specifically on the frequencies of the wireless system the card assembly is designed to communicate with. The antenna and card assembly could be contained in a single package, which could be easily inserted into and removed from the host terminal, allowing ease of setup for wireless communications and easy transportation. The single package would prevent the need for coaxial cable and connectors to connect the card assembly to the antenna, further facilitating portability.

The location of an antenna contained within an electronic card assembly is a critical factor in attaining optimum RF reception at the antenna and, optimum performance of receiver and/or transmitter circuitry contained within the assembly. For example, present day electronic card assemblies containing receiving and/or transmitting devices utilize miniaturized components and, consequently, when a card assembly is inserted into a standard recessed PCMCIA slot a significant number of the components and circuits of the assembly may be enclosed within the walls of the host terminal surrounding the slot. When the card assembly is so enclosed, significant RF interference between the host terminal and the receiver and/or transmitter of the electronic card assembly can occur. To prevent this interference electronic shielding is often placed within the card assembly, or in the host terminal itself, around the area of the terminal surrounding the recessed PCMCIA slot. If the card assembly or area of the host terminal surrounding the PCMCIA slot is shielded, the placement of an antenna within the PCMCIA card assembly results in a receiver and/or transmitter enclosed by shielding and with degraded performance. Because it is desirable to shield the card assembly or area of the host terminal surrounding the PCMCIA slot, it would be advantageous to locate the antenna as far as possible from the enclosed portion of the card assembly. Additionally, it is always advantageous to have the antenna far enough away from the host terminal to minimize RF interference between the antenna and electronic components in the host terminal.

Locating an antenna contained within a card assembly away from the enclosed portion of the card assembly and away from the host terminal may result in a card assembly package of awkward shape or size. For example, PCMCIA card assemblies are manufactured to dimensions that form a single compact package. An external antenna on a PCMCIA card assembly may prevent placement of the card assembly in a pocket or case for easy transportation. Also, an exposed external antenna may be subject to breakage during transportation.

It would provide an advantage then to have a portable electronic card assembly having an antenna optimized for use with receiver and/or transmitter circuitry in the electronic card assembly, where the performance of the antenna is not degraded by being located in close proximity to a host terminal, and where the dimensions of the electronic card assembly are not increased by the antenna when the antenna is not in use. Additionally, it would be advantageous if the antenna did not affect portability by requiring bulky and expensive connectors. It is a shortcoming and deficiency of the prior art that such an electronic card assembly has not yet been made.

SUMMARY OF THE INVENTION

The present invention overcomes the shortcoming and deficiency mentioned above by providing an electronic card assembly having an antenna contained within the casing of the electronic card assembly. When a communications device contained in the card assembly is to be operated the antenna may be extended from within the electronic card assembly casing. This removes the antenna from shielded areas in which performance degradation could occur. When the communications device is not operated, or the card assembly is removed from the host device for transportation or storage, the antenna may be retracted into the card assembly. This allows the card assembly to be easily transported and prevents breakage of the antenna during transportation. Additionally, the antenna does not effect the portability of the electronic card assembly by requiring bulky and expensive connectors.

In one aspect, the invention provides an electronic card assembly comprising a casing having a connector for coupling the electronic card assembly to a host terminal, and an antenna that is coupled to the casing and is selectably movable between a retracted position in which the antenna is enclosed within the casing and an extended position in which the antenna element is substantially outside of the casing, by sliding the antenna from within the casing.

In a second aspect of the invention, the casing has a pair of substantially parallel sides, the antenna has a pair of parallel edges, and the antenna is coupled to the casing by each of the parallel edges being coupled to the substantially parallel sides of the casing.

In a further aspect of the invention, the casing is dimensioned in accordance with the Personal Computer Memory Card International Association (PCMCIA) standard and the connector comprises a data port constructed in accordance with the PCMCIA standard.

In another aspect of the invention, the antenna comprises a first circuit board and an antenna element is disposed on the first circuit board.

In a still further aspect of the invention, a second circuit board is contained within the casing of the electronic card assembly, and an RF signal path between the antenna and second printed circuit board is provided by each of at least one transmission pads, when the antenna is in the second position.

In an even further aspect of the invention, each of the at least one transmission pads comprises a first conducting pad disposed on a surface of the first circuit board, a second conducting pad disposed on a surface of the second circuit board, and a dielectric pad positioned to contact said first and second conducting pads to provide the RF signal path between the antenna and second printed circuit board, when the antenna is in the second position.

BRIEF DESCRIPTION OF THE DRAWINGS

Further aspects, advantages, and novel features of the present invention will become apparent from the following detailed description of the invention when considered in conjunction with the accompanying drawings in which:

FIGS. 4A and 4B are a top plan view of the electronic card assembly of FIG. 1 and a cross-sectional left side view taken along line BB—BB of FIG. 3A, respectively, both with the antenna in the extended position.

DETAILED DESCRIPTION OF THE INVENTION

Figure 1:
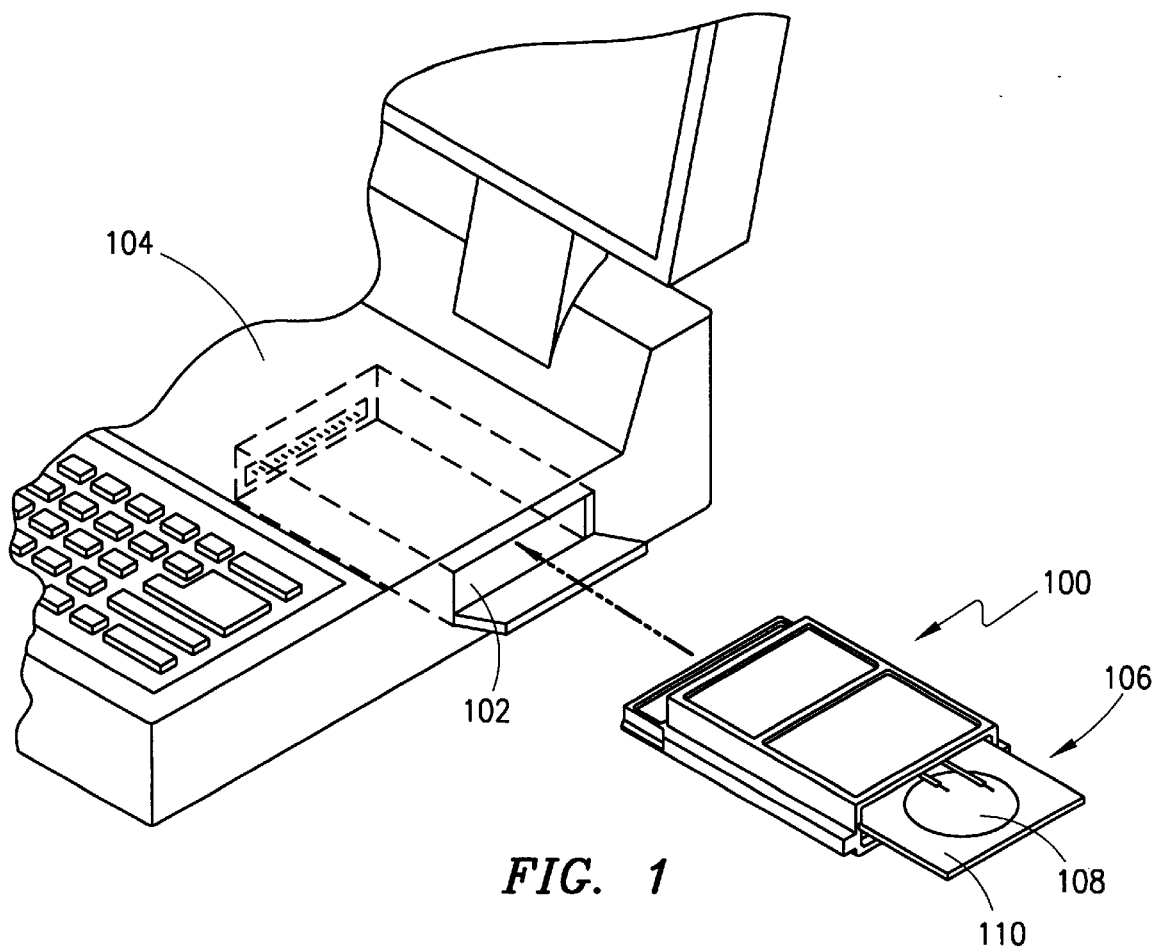
FIG. 1. illustrates a card assembly formed according to the teachings of the present invention that may be inserted into a standard PCMCIA slot of a laptop computer.

Referring now to the drawings, wherein like or similar elements are generally designated with identical reference numerals throughout the several views, and wherein the various elements depicted are not necessarily drawn to scale, there is shown a card assembly according to the teachings of the present invention.

FIG. 1, in particular, illustrates an electronic card assembly (generally designated by reference numeral 100) formed according to the teachings of the present invention that may be inserted into a slot 102 of a laptop computer 104. Electronic card assembly 100 may contain receiver and/or transmitter circuitry for implementing data transfer and communications between laptop computer 104 and a wireless network. An antenna, generally designated by reference numeral 106, is included in electronic card assembly 100 to enable the receiver and/or transmitter circuitry to transmit and receive signals to and from the wireless network. Antenna 106 includes an antenna element 108 disposed on a printed circuit board 110. The position of retractable antenna 106 is selectable between an extended position, as shown in FIG. 1, and a retracted position. When it is desired to implement data transfer or communications between laptop computer 104 and a wireless network, retractable antenna 106 is placed in the extended position. When retractable antenna 106 is in the extended position, antenna element 108 is removed from within the area enclosed by slot 102. The antenna element 108 is also removed from within card assembly 100. This minimizes interference or RF signal attenuation caused by shielding which may be placed around components in the card assembly 100 or around slot 102 of laptop computer 104 to prevent interference between card assembly electronics and computer circuitry. This also minimizes interference between the antenna element 106 and components within computer 104 or the electronic card assembly 100 itself. When it is not necessary to implement data transfer or communication between laptop computer 104 and electronic card assembly 100, or when card assembly 100 is removed from laptop computer 104 for transportation, antenna 106 may be placed in the retracted position.

Figure 2:
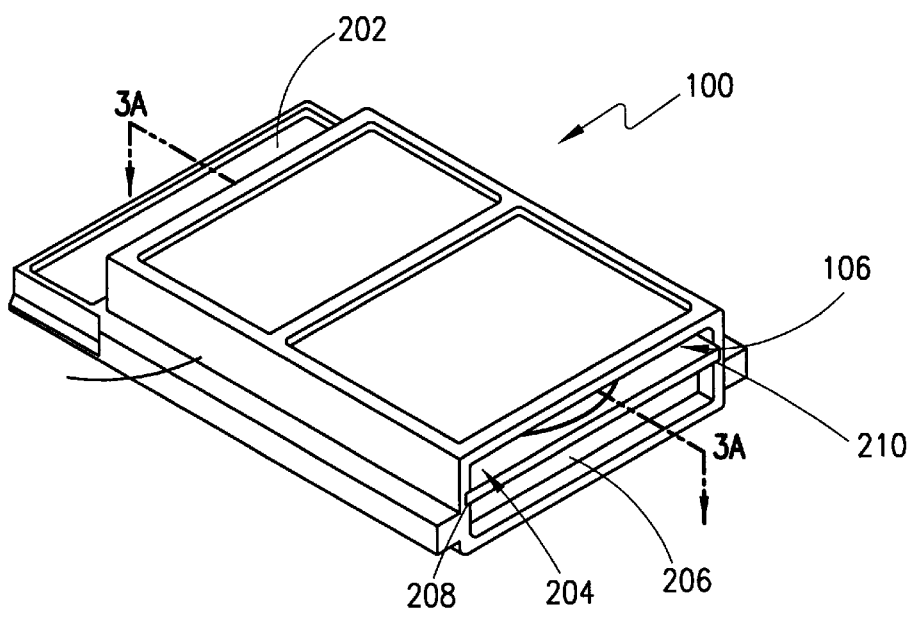
FIG. 2 is a top left perspective view of the card assembly shown in FIG. 1 having the antenna in the retracted position.

Referring now to FIG. 2, there is shown a top left perspective view of the electronic card assembly 100 having antenna 106 in the retracted position. The electronic card assembly 100 includes an casing 200 having a connector section 202. Casing 200 includes a chamber 204 which encloses the electronic components and printed circuit boards (not shown) of the electronic card assembly 100. A barrier 206 at the right side of the assembly 100 extends from the bottom of the chamber 204 to a height approximately equal to the height of the connector 202. The casing 200 may be manufactured with Type III PCMCIA dimensions of 85.6 mm×54.0 mm×10.5 mm, and the connector section 202 may be configured according to the PCMCIA 68 pin standard card interface. This would provide compatibility to host terminals, such as laptop computer 104 when slot 102 was also constructed in accordance with Type III PCMCIA Standards. Antenna 106 may be moved from the extended position (shown in FIG. 1) to the retracted position (shown in FIG. 2) by sliding antenna 106 along grooves 208 and 210, that are formed in chamber 204 along the internal walls of the casing 200. Grooves are not essential to embodiments of the present invention. Antenna 106 could simply fit snugly within casing 200 so as to be controllably slidable, or other conventional sliding control means such as those employing rollers could be used. This allows electronic card assembly 100 to be easily transported by moving antenna 106 into the retracted position when electronic card assembly 100 is removed from the host device. When antenna 106 is in the retracted position for transportation it would also be less subject to breakage.

Figure 3A:
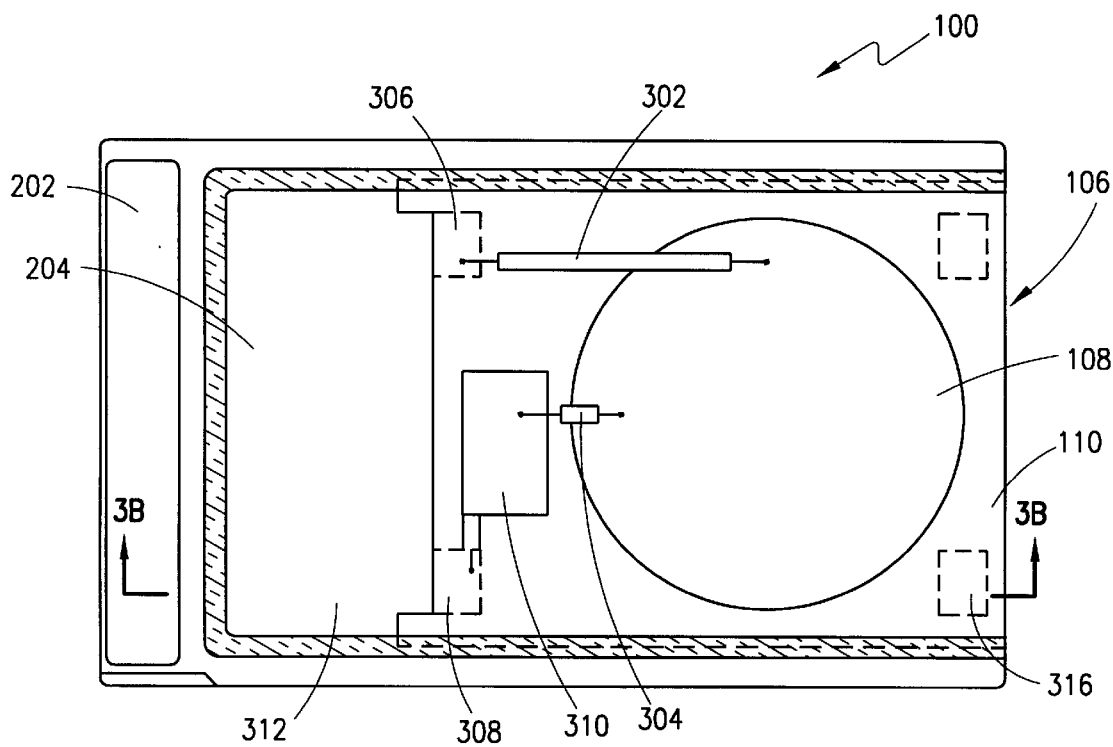
FIGS. 3 A and B are a cross-sectional top plan view taken along line 3A—3A of FIG. 2, and a cross-sectional left side view taken along line BB—BB of FIG. 3A, respectively.
Figure 3B:
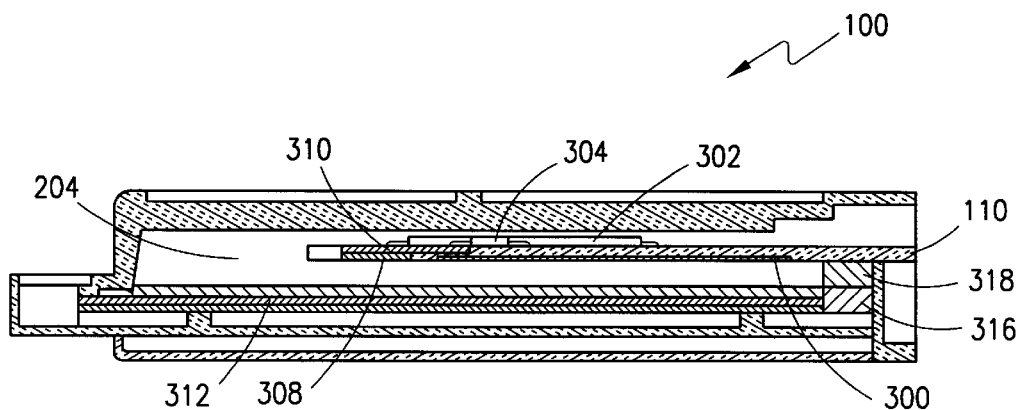

Referring now to FIGS. 3A and 3B, there shown a cross-sectional top plan view taken along line 3A—3A of FIG. 2 and a cross-sectional left side view taken along line BB—BB of FIG. 3A, respectively. Antenna 106 comprises antenna element 108 formed of a circular metallic pad disposed on the top surface of printed circuit board 110, and a ground plane 300 disposed on the bottom surface of printed circuit board 110. The electronic card assembly 100 includes conducting pads 306 and 308 (shown by dotted lines in FIG. 3A) which are disposed on the bottom surface of printed circuit board 110. Coaxial feed probe 302 and coaxial feed probe 304 connect antenna element 108 to conducting pad 306 and conducting pad 308, respectively, through printed circuit board 110. A 9° phasing element 310 is included in the connection path between coaxial feed probe 304 and conducting pad 308. A stationary printed circuit board 312, mounted within card assembly 100 and interfacing with connector 202, includes conducting pad 314 (shown by dotted line in FIG. 3A) and conducting pad 316 disposed on its top surface near its outer end. Dielectric pad 318 of substantially the same dimensions as conducting pad 316 is mounted on conducting pad 316. A second dielectric pad (not shown) is mounted in an identical manner on conducting pad 314.

Electric components of the receiver and/or transmitter circuitry of the electronic card assembly 100 may be mounted on stationary printed circuit board 312. Components needing less vertical space than is available between printed circuit board 110 and stationary printed circuit board 312 may be mounted anywhere on the surface of stationary printed circuit board 312. Components needing more vertical space may be mounted in the portion of a chamber 204 (best seen in FIG. 3B) where the components do not interfere with the movement of antenna 106. Conducting pads 306 and 308 are positioned on the bottom surface of circuit board 110 so that pads 306 and 308 make contact with the dielectric pad disposed on conducting pad 314 and with dielectric pad 318, respectively, when the antenna 106 is placed in the extended position. Dielectric pad 318 and the identical dielectric pad disposed on conducting pad 314 are of a height such that the exposed surfaces of conducting pads 306 and 308 contact the upper surfaces of the dielectric pad disposed on conducting pad 316 and dielectric pad 318 firmly. Projecting stops could be positioned on printed circuit board 110 so that the stops contact, and are stopped by, barrier 206 when moved to the extended direction. This would aid in positioning antenna 106 correctly and prevent antenna 106 from completely coming from within casing 200. Other conventional means for preventing one element from sliding completely out and away from another element containing the one element could also (or could instead) be employed to perform this function. To facilitate a tight contact, the upper surfaces of the dielectric pads may be inclined slightly downward in the direction of the movement of antenna 106 away from the extended position. The lower surface of the conducting pads on printed circuit board 110 may then be angled downward in the same direction so that the surfaces of the conducting pads and dielectric pads meet flush as antenna 106 is moved toward the extended position. The pads would then also act as stops. The surfaces of the conducting pads on printed circuit board 312 may also be inclined to maintain the conducting pad surfaces parallel to each other when antenna 106 is in the extended position.

Referring now to FIGS. 4A and 4B, there are shown a top plan view of the electronic card assembly of FIG. 1, and a cross-sectional left side view taken along line BB—BB of FIG. 3A, respectively, with the antenna in the extended position. When retractable antenna 106 is in the extended position, conducting pad 316 is coupled to conducting pad 308 through dielectric pad 318, forming transmission pad 320, and conducting pad 314 is coupled through the identical dielectric pad disposed on its surface to conducting pad 306 to form a 3 layer transmission pad (not shown) identical to transmission pad 320. The transmission pads form an RF signal path between the antenna and the stationary printed circuit board 312. RF signal feeds are then available at conducting pads 314 and 316 of printed circuit board 312. For use, the same RF signal is fed to both conducting pad 314 and conducting pad 316. Transmitter and/or receiver circuitry within the electric card assembly 100 can then receive or transmit using antenna 106.

The antenna element may be dimensioned, and RF signal feeds from the antenna may be constructed, to optimize RF reception and transmission at frequencies within the frequency bands of the wireless system within which the electronic card assembly is to be operated. Such an antenna may be designed by methods known in the art. For example, microstrip antenna design is discussed in *Akhileshwar Kumar, Fixed and Mobile Terminal Antennas,* Artech House Inc. 1991, pp. 216–232.

In the embodiment shown, antenna element 108 may have a radius (a) of 22.55 mm, and printed circuit board 110 may have a thickness (h) of about 1.6 mm and be comprised of FR4 which has a representative dielectric constant of approximately 4.0. Two feed probes 90° out of phase and placed 90° apart on the circumference of antenna element create a circularly polarized wave at the fundamental mode ($TM_{11}$) (the fundamental mode defines the radiation pattern of the antenna as is known in the art). The center frequency (f) of this antenna can be calculated as follows:

$$f = \frac{\alpha_{nm} C}{2\pi (Aeff(\epsilon r))^{1/2}}$$

where, $$Aeff = a \left[ 1 + \frac{2h}{2\pi a \epsilon r} \left( \ln \pi \frac{a}{2h} + 1.7726 \right) \right]^{1/2}, \text{ where } \frac{a}{h} \gg 1.$$

$$\text{Here, } Aeff = 22.55 \left[ 1 + \frac{2(1.6)}{2\pi (22.55)(4.0)} \left( \ln \frac{\pi(22.55)}{2(1.6)} + 1.7726 \right) \right]$$

or $Aeff = 22.81$ mm where, $_{nm}$ is first (mth) zero derivative of the Bessel function of order 2, $\epsilon r$ is the relative permittivity of printed circuit board 110, and C is the speed of light in free space.

For $TM_{11}$, $_{11}32$ 1.82;

$$f = \frac{1.82(3.0 \times 10^{11})}{2\pi (22.81)(4.0)^{1/2} \text{sec.}}$$

or $f = 1910$ MHZ.

If 50 ohm transmission lines are used for the feed probes 302 and 304, the equivalent feed probe capacitance $C_1$, would be:

$$C_1 = \frac{1}{2\pi f r},$$

where, r=the impedance of the transmission line.

$$\text{Here, } C_1 = \frac{1}{2\pi(1910\,\text{MHZ})(50\,\text{ohm})}$$

or $$C_1 = 1.7 \times 10^{-12}\,F.$$

The capacitance between the conducting pads 306 and 308, and between conducting pads 314 and 316, must be clearly larger than this equivalent value to prevent energy loss. The capacitance between the conducting pads 306 and 308, and between conducting pads 314 and 316 can be calculated from the formula:

$$C = \frac{\epsilon(\text{area})}{\text{distance}}.$$

With 6 mm×6 mm conducting pads used for pads 306, 308, 314 and 316, and a 0.2 mm thick dielectric layer having a typical relative coefficient of 8 forming the layer between the conducting pads when the antenna is extended, the capacitance $C_2$ between each pair of conducting pads can be calculated as follows:

$$C_2 = \frac{7.1 \times 10^{-11}(.006\,\text{m})(.006\,\text{m})}{.0002\,\text{m}},$$

or $$C_2 = 12.8 \times 10^{-12}\,F.$$

Since $C_2$ is much larger than $C_1$, the RF signal will pass easily through each conducting pad pair capacitance since each is in series with a transmission line impedance.

The particular embodiment of the present invention described hereinabove is well suited for use with the new personal communication services (PCS) frequencies in the 1800–2000 MHZ range, which are currently under development by the telecommunications industry and its governing bodies.

By arranging the angular spacing of the feed probes, different order modes of circular polarization are possible. Second ($TM_{21}$) and third ($TM_{31}$) order modes for circular polarization can be generated by placing two probes 45° and 135° apart, respectively. The number of probes may also be varied. One feed probe generates a broadside radiation pattern. A minimum of two feed probes angularly spaced are needed for circular polarization. The number of transmission pads can also vary. The feed probes may be connected to one or more conducting pads disposed on the sliding printed circuit board. Each of these conducting pads will contact a separate dielectric layer mounted on a conducting layer of the stationary printed circuit board to form a transmission pad identical to transmission pad 320, when the antenna is in the extended position. The RF signal can then be fed to, and from, the one or more conducting pads of the stationary printed circuit board. The center frequency of the antenna can also be varied by changing the radius (a) of the antenna element 108, the thickness (h) of circuit board 110 and/or the material (and the dielectric coefficient) of the circuit board 110.

Figure 5:
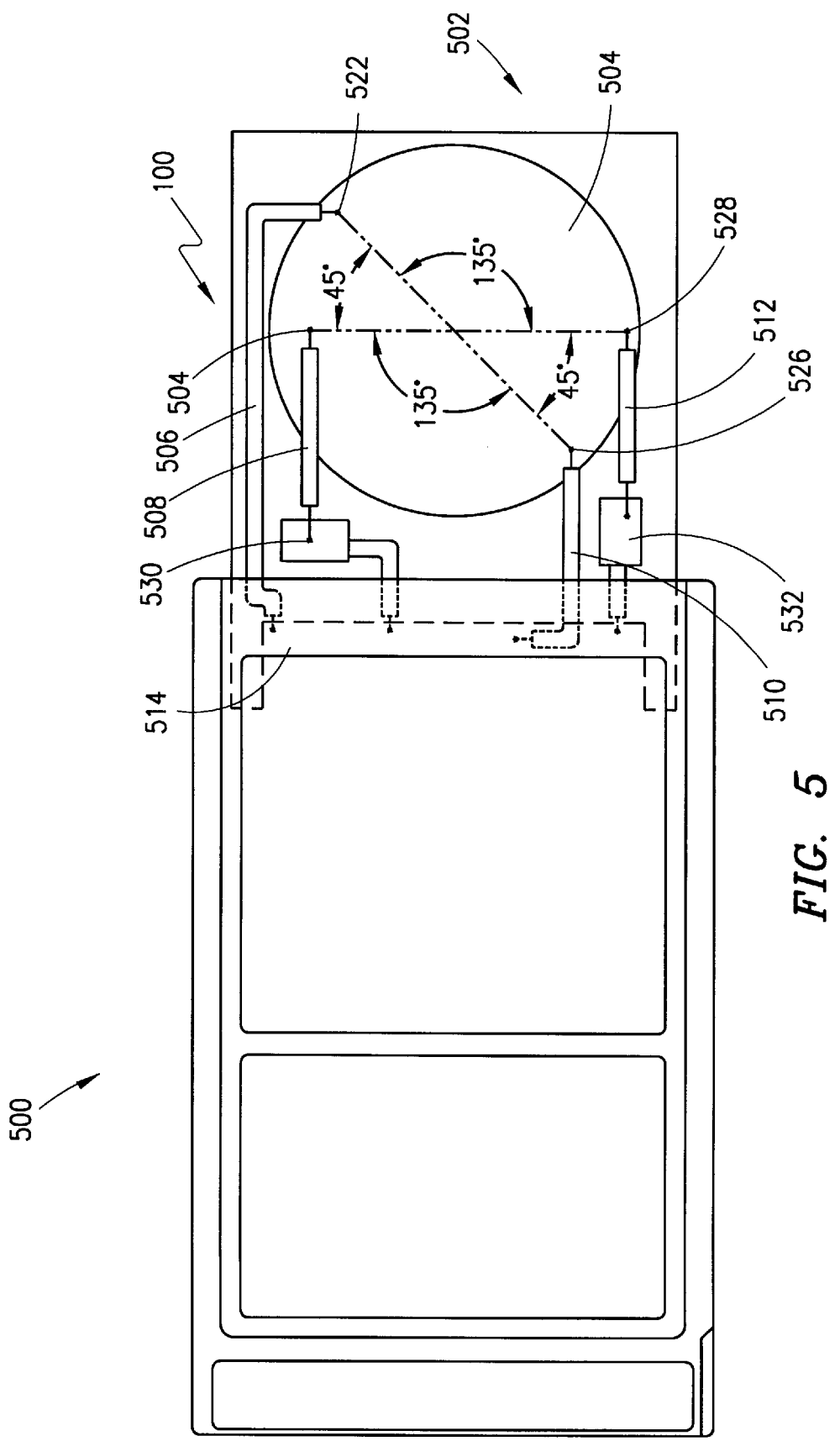
FIG. 5 is a top plan view of an alternative embodiment of an electronic card assembly according to the teachings of the present invention, with the antenna in the extended position.

In an alternative embodiment of the invention, four feed probes are used. This results in greater suppression of unwanted modes than is achieved with two feed probes. Referring now to FIG. 5, there is shown a top plan view of an alternative embodiment of an electronic card assembly 500 according to the teachings of the present invention with the antenna 502 in the extended position. Electronic card assembly 500 is identical in construction and operation to the electronic card assembly 100 described and shown in FIGS. 1–4B, with the exception that the antenna element 504 of FIG. 5 has four feed probes, 506, 508, 510, and 512, instead of two. In this alternative embodiment, feed probes 506, 508, 510, and 512, provide an RF signal path between a single conducting pad 514 and antenna element 504. The feed probes 506, 508, 510, and 512 are coupled to the circular border of the antenna elements at points 522, 524, 526, and 528, respectively, so that there is an angular spacing of 45° between point 522 and point 524, an angular spacing of 135° between points 524 and 526, an angular spacing of 45° between points 526 and 528, and an angular spacing of 135° between points 528 and 522. 90° phasing elements 530, 532 are placed between feed probe 508 and conducting pad 514, and feed probe 512 and conducting pad 514, respectively. This construction creates a polarized wave at the fundamental mode $TM_2$, with greater suppression of unwanted modes than is attained with two feed probes.

Antenna 502 may be moved from the extended position to the retracted position identically to antenna 106 of FIGS. 1–4B. When antenna 502 is in the extended position conducting pad 514 contacts a dielectric layer disposed on a conducting pad (not shown) that is disposed on a surface of a stationary circuit board (not shown) that is identical to stationary printed circuit board 110 of card assembly 100, to form a 3 layer transmission pad. In this second embodiment the single transmission pad is used instead of the two used in the first embodiment. Although the transmission pad is larger in size, the principle of the transmission pad is identical to the 3 layer transmission pad 320 shown in FIG. 4B, that is formed by conducting layer 308, dielectric layer 318, and conducting layer 316, when antenna 106 is in the extended position.

Based upon the foregoing, those skilled in the art should now fully understand and appreciate the considerable advantages and novel features of the present invention. By creating a plug-in electronic card assembly with receiver and/or transmitter circuitry and including an antenna which can be selectively retracted into and extended from the casing of the electronic card assembly, a more compact, easily transportable card assembly which is less prone to breakage during transportation can be realized. An antenna of this type does not require bulky and expensive connectors, as would an antenna contained in the host device. Use of an extendable antenna can also minimize RF interference between components of a host terminal or the electronic card assembly with the antenna, and prevent RF signal attenuation on the antenna caused by shielding contained within the electronic card assembly or host device.

It is believed that the operation and construction of the present invention will be apparent from the foregoing description. While the invention shown and described herein has been characterized as existing in the form of particular embodiments, obvious changes and modifications may be made thereto without departing from the spirit and scope of the invention as defined in the following claims.

What is claimed is:

1. A computer system having an electronic card assembly comprising:
   a casing having a connector for detachably coupling said electronic card assembly to said computer system; and
   a rigid antenna, said rigid antenna being coupled to said casing so that said rigid antenna is selectably movable between a first position, wherein said rigid antenna is substantially enclosed within said casing, and a second position, wherein said rigid antenna is substantially outside of said casing, by sliding said rigid antenna from within said casing; said rigid antenna comprising:
   a first circuit board; and
   an antenna element disposed on said first circuit board, said antenna element comprising:
      a circular microstrip antenna disposed on a first surface of said first circuit board; and
      a ground plane disposed on a second surface of said first printed circuit board;
      wherein said first and second surfaces are substantially parallel to each other.

2. The electronic card assembly of claim 1 wherein said computer system, said casing is substantially enclosed by said computer system when said connector is coupled to said computer system.

3. The electronic card assembly of claim 1 wherein said antenna element has a diameter of about 45.1 mm.

4. The electronic card assembly of claim 1 wherein said antenna has a center frequency of about 1910 MHZ.

5. The electronic card assembly of claim 1 wherein said connector comprises a data port constructed in accordance with the Personal Computer Memory Card International Association (PCMCIA) standard.

6. The electronic card assembly of claim 1, wherein said casing has a pair of substantially parallel sides and wherein said rigid antenna has a pair of parallel edges, and, further, wherein said rigid antenna is slidably coupled to said casing by said parallel edges of said rigid antenna being slidably coupled to said substantially parallel sides of said casing.

7. The electronic card assembly of claim 6, wherein each of said substantially parallel sides of said casing has a groove running lengthwise and, further, wherein each of said parallel edges of said rigid antenna is coupled to said substantially parallel sides of said casing by being slidably contained within said grooves in said substantially parallel sides.

8. The electronic card assembly of claim 1 wherein said casing is dimensioned in accordance with the Personal Computer Memory Card International Association (PCMCIA).

9. The electronic card assembly of claim 8 wherein said casing is dimensioned according to a Type III PCMCIA card.

10. The electronic card assembly of claim 1, further comprising:
    a first circuit board mounted within said casing; and
    at least one transmission pad, said at least one transmission pad forming an RF signal path between said rigid antenna and said first circuit board when said rigid antenna is in said second position.

11. The electronic card assembly of claim 10, wherein said rigid antenna comprises a circular microstrip antenna element disposed on a first surface of a second circuit board, and wherein said rigid antenna further comprises a ground plane disposed on a second surface of said second circuit board.

12. A computer system having an electronic card assembly comprising:
    a casing having a connector for coupling said electronic card assembly to said computer system, said casing being substantially enclosed by said computer system when said connector is coupled to said computer system;
    a rigid antenna, said antenna being coupled to said casing so that said antenna is selectably movable between a first position, in which said antenna is substantially enclosed within said computer system, and a second position, in which said rigid antenna is substantially outside of said computer system, by sliding said rigid antenna from within said casing, wherein said rigid antenna comprises a circular microstrip antenna element disposed on a first surface of a first circuit board and a ground plane disposed on a second surface of said first circuit board;
    a second circuit board, said second circuit board mounted within said casing; and
    at least one transmission pad forming an RF signal path between said rigid antenna and said second circuit board when said rigid antenna is in said second position pad, said at least one transmission pad including a first transmission pad coupled through a first, a second, a third, and a fourth transmission line to a first, a second, a third, and a fourth point, respectively, on a circumference of said antenna element.

13. The electronic card assembly of claim 12 wherein said first and second points along said circumference are placed at about a 45° angular spacing, said third and fourth points along said circumference are placed at about a 45° angular spacing and, further, said second and third points along said circumference are placed at about a 135° angular spacing and, further, wherein said first and third transmission lines are coupled to said transmission pad through about a 90° phase shifting element.

14. A computer system having an electronic card assembly comprising:
    a casing having a connector for detachably coupling said electronic card assembly to said computer system;
    a rigid antenna, said rigid antenna being coupled to said casing so that said rigid antenna is selectably movable between a first position, wherein said rigid antenna is substantially enclosed within said casing, and a second position, wherein said rigid antenna is substantially outside of said casing, by sliding said rigid antenna from within said casing; said rigid antenna comprising:
    a circular microstrip antenna element disposed on a first surface of a second circuit board; and
    a ground plane disposed on a second surface of said second circuit board;
    a first circuit board mounted within said casing; and
    at least one transmission pad, said at least one transmission pad forming an RF signal path between said rigid antenna and said first circuit board when said rigid antenna is in said second position.

* * * * *